April 5, 1949.　　　A. F. TABORSKI　　　2,466,131
NOVELTY NECKTIE
Filed Oct. 28, 1946
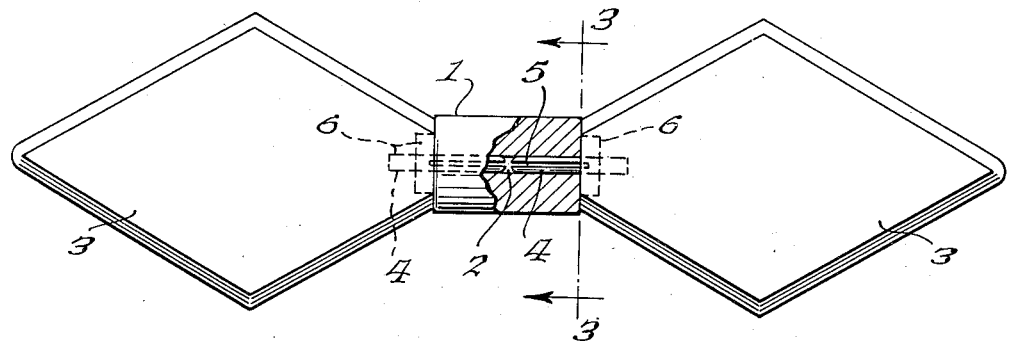
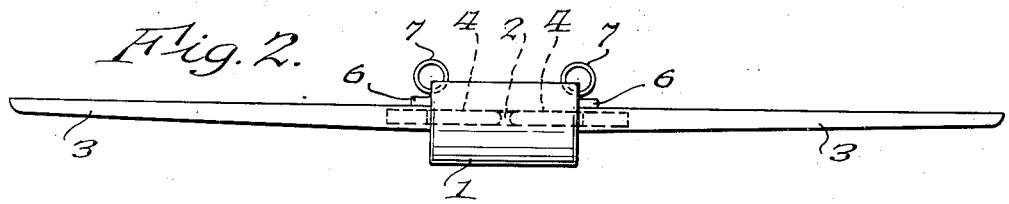
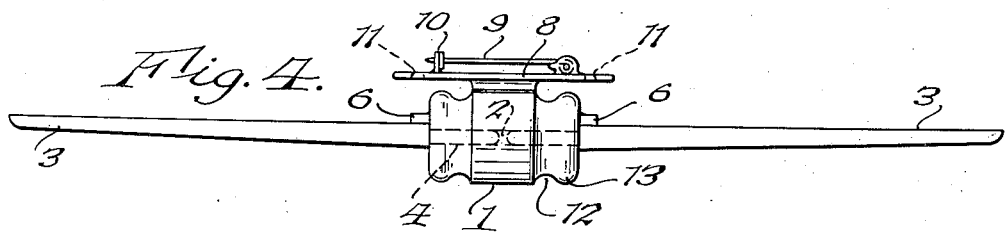
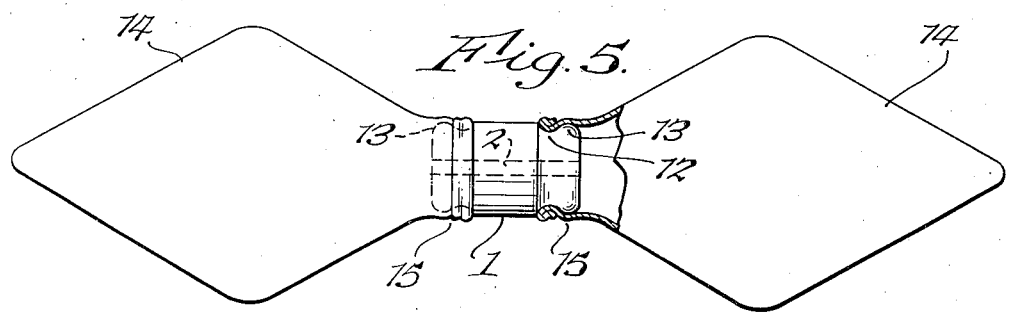
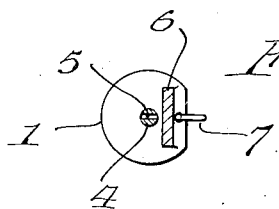
INVENTOR.
Alfred F. Taborski
BY
Parker Prochnow & Farmer
Attorneys.

Patented Apr. 5, 1949

2,466,131

UNITED STATES PATENT OFFICE 2,466,131

NOVELTY NECKTIE

Alfred F. Taborski, Buffalo, N. Y.

Application October 28, 1946, Serial No. 706,175

7 Claims. (Cl. 2—151)

This invention relates to novelty display devices, and particularly to those which may be detachably secured to garments.

An object is to provide an improved device of this type, with which generally flat wing elements may be detachably connected to a base member so as to be interchangeable, and assembled on said member with either face of each forward; with which the faces of said elements may carry pictures, words, symbols or other information that is to be displayed; which may be worn as a necktie or pinned to any part of a garment; which will be simple, light in weight, attractive and novel in appearance, and relatively inexpensive so that it may be discarded in part or entirety when its purpose has been served.

Other objects and advantages of the invention will be apparent from the following description of an embodiment of the invention, and the novel features will be particularly pointed out hereinafter in connection with the appended claims.

In the accompanying drawing:

Fig. 1 is a front elevation, partly broken away, of a device constructed in accordance with this invention;

Fig. 2 is a plan of the same;

Fig. 3 is a transverse, sectional elevation of the same, the section being taken approximately along the line 3—3 of Fig. 1;

Fig. 4 is a plan generally similar to Fig. 2 but illustrating a modification thereof; and Fig. 5 is a view generally similar to Fig. 1, but illustrating another modification thereof.

In the embodiment illustrated in Figs. 1 to 3, the device includes a generally cylindrical body member or base 1, having a socket or passage 2 from end to end therethrough, and generally flat, plate-like, wing elements 3 disposed at opposite ends of member 1 and abutting endwise thereagainst. The abutting ends of member 1 and wings 3 are detachably connected by pin and socket couplings. In this example, each element 3, at its end abutting the member 1, carries a projecting pin 4 that fits and enters said passage. The projecting part of the pin is slit at 5 from its free end to form fingers that are sprung slightly together at their free ends when the pin enters passage 2, so as to be frictionally held in the passage, thereby forming a detachable connection between that element and the member 1. The pin could remain in the passage and engage at its other end in a recess in element 3.

Abutments 6 extend from the ends of member 1 in slightly overrunning and close relation to the wing elements 3, so as to prevent rotation of elements 3 about the axis of passage 2. The member 1 also carries at one side thereof and adjacent its ends, loops or rings 7 by which the device may be supported. For example, an elastic cord or strap (not shown) that often encircles the neck band of a shirt or collar to secure a bow-tie in position, carries hooks at its ends that may engage in loops 7 to support the member 1 at the front of the collar, like a bow necktie, or any other attachment may be employed for mounting member 1 on a garment.

The faces of elements 3 may carry symbols, words or pictures to be displayed. For example, one element 3 may carry a candidate's name on its front face, and the other element may carry on its front face the name of the office for which the candidate is running. If desired, one element may carry a picture of the candidate and the other his name, or advertising slogans may be carried on both elements. The elements 3 may be detached, rotated through a half rotation, and reattached, or the elements 3 may be replaced by new elements having new symbols, so that the messages displayed by the elements may be quickly and easily changed.

In the embodiment illustrated in Fig. 4, the member 1 may mount the wing elements 3 in the same manner, but the loops 7 are replaced by a bar 8 having hinged thereto a pin 9, with its free end selectively engageable in a hook 10. The ends of the bar 8 are provided with apertures 11 in which hooks on the end of a collar encircling strap may be engaged. The member may be pinned to a dress, a coat lapel, or any other part of a garment, or supported at the front of a collar in place of a bow-tie.

In the embodiment shown in Fig. 5, the member 1 is formed as in Fig. 4, with supporting parts 8 to 11, but with an annular groove 12 and an adjacent rib 13 extending peripherally of each end, and each wing element 14 has a tubular end 15 of soft, elastic rubber that stretches over an end of member 1 to engage over the rib 13 and in the groove 12. This engagement frictionally holds the wing elements to the member 1 in substitution for the frictional engagement between pin 4 and passage 2 in Figs. 1 to 3. The major parts of elements 14 are flat and may also be formed of flexible rubber. The faces of elements 14 may carry pictures, words or symbols to be displayed in the same manner as in Figs. 1 to 4.

A device formed in this manner is exceptionally simple and inexpensive, and may be used to display information in a novel and effective manner. This information may be changed easily and quickly as desired. The member 1 and wings 3 are preferably formed of any suitable moldable material or of plastic material, so that the device will be inexpensive and light in weight.

It will be understood that various changes in the details, materials and arrangements of parts, which have been herein described and illustrated in order to explain the nature of the invention, may be made by those skilled in the art within the principal scope of the invention, as expressed in the appended claims.

I claim:

1. A novelty display device comprising a member, a pair of separate, generally flat, plate-like wing elements disposed at opposite ends of said member and abutting endwise thereof, said member and each abutting element having pin and socket engagement for detachably and individually connecting them, the exterior of said member and each element also having overrunning abutting surfaces in addition to the pin and socket which prevent rotation relatively to said member of that element about the axis of said pin and socket connection, and mounting means carried by said member at one side thereof and offset from the faces of said elements.

2. A novelty display device comprising a member, a pair of separate, generally flat, plate-like wing elements disposed at opposite ends of said member and abutting endwise thereof, said member and each abutting element having pin and socket engagement for detachably and individually connecting them, each pin being longitudinally slit for a substantial distance from its free end, with the sections formed by the slits sprung slightly towards each other by the walls of said related socket when inserted in the socket for frictionally holding the wing elements detachably to the ends of said member, and attaching means carried by said member at one side thereof and offset from the extended planes of the faces of said elements.

3. A novelty display device comprising a generally cylindrical member, a pair of separate, generally flat, plate-like wing elements disposed at opposite ends of said member, end to end therewith, overrunning slightly with the ends of said member, and detachably and individually coupled thereto, and means carried by the exterior of said member at one side thereof and offset from the extended planes of the faces of said wing elements by which said member may be supported with the cylindrical axis of said member generally horizontal.

4. A novelty display device comprising a generally cylindrical member, a pair of separate, generally flat wing elements disposed at opposite ends of said member, end to end therewith, and each having a tubular elastic end of elastic rubber stretched over an end of said member in slightly overrunning relation thereon, and means carried by said member at one side thereof and offset from the extended planes of the faces of said wing elements by which said member may be supported with the cylindrical axis of said member generally horizontal.

5. A novelty display device comprising a generally cylindrical member, a pair of generally flat wing elements disposed at opposite ends of said member, end to end therewith, and each having a tubular elastic end of elastic rubber stretched over an end of said member in slightly overrunning relation thereon, each end of said member and overrunning part of each element having annular, peripheral, interfitting cooperative ribs and grooves that yieldingly and elastically resist removal of said elements from said member, and means carried by said member at one side thereof and offset from the extended planes of the faces of said wing elements by which said member may be supported with the cylindrical axis of said member generally horizontal.

6. A novelty display device comprising a generally cylindrical, rigid member having recesses in opposite ends thereof and axially aligned with each other, a pair of generally flat wing elements disposed at opposite ends of said member, end to end therewith, the end of each element adjacent said member having a pin projecting endwise therefrom and received in said recess in the adjacent end of said member, each pin being frictionally held in its related recess, and means carried by said member at one side thereof and offset from the extended planes of the faces of said wing elements by which said member may be supported with its cylindrical axis generally horizontal.

7. A novelty display device comprising a generally cylindrical, rigid member having recesses in opposite ends thereof and axially aligned with each other, a pair of separate generally flat wing elements of sheet material disposed at opposite ends of said member, end to end therewith, the end of each element adjacent said member having a pin projecting endwise therefrom and fitting and received in said recess in the adjacent end of said member, each pin being frictionally held in its related recess, said member and each element having additional abutting surfaces slightly overrunning in a direction parallel to the cylindrical axis of said member and eccentric to the axis of said pin of that element, to prevent rotation of said elements on the axes of said pins, and means carried by said member at one side thereof and offset from the extended planes of the faces of said wing elements by which said member may be supported with its cylindrical axis generally horizontal.

ALFRED F. TABORSKI.

REFERENCES CITED

The following references are of record in the file of this patent:

UNITED STATES PATENTS

| Number | Name | Date |
| --- | --- | --- |
| 1,287,370 | McCaughey | Dec. 10, 1918 |
| 1,391,102 | Ford | Sept. 20, 1921 |
| 1,531,230 | Bernstein | Mar. 24, 1925 |